Patented Nov. 20, 1951

2,575,585

UNITED STATES PATENT OFFICE 2,575,585

ACRYLATES, POLYMERS, AND COPOLYMERS

Fred W. Cox, Atlanta, Ga., and James M. Wallace, Jr., Akron, Ohio, assignors to Wingfoot Corporation, Akron, Ohio, a corporation of Delaware No Drawing. Application February 4, 1949, Serial No. 74,707

8 Claims. (Cl. 260—77.5)

This invention relates to acrylates, their polymers and copolymers. More specifically, this invention relates to the acrylates having the general formula

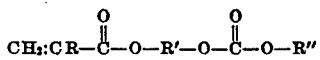

in which R is chlorine, hydrogen or an alkyl radical and in which R'' is an alkyl radical and R' is an alkylene radical.

The acrylate containing the carbonate linkage may be prepared by a number of different methods. A preferred method of preparing the acrylate comprises reacting ethylene glycol with ethyl acrylate to form 2-(hydroxy) ethyl acrylate, also referred to as glycol monoacrylate, having the formula

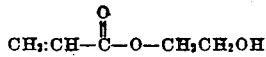

More specifically, this acrylate is prepared by reacting five mols of ethylene glycol with 8 mols of ethyl acrylate in the presence of 1 ml. of concentrated sulfuric acid and a polymerization inhibitor such as hydroquinone at reflux temperature for 4 hours. The resulting glycol monoacrylate is then reacted with an alkyl chloroformate at —10° C. in the presence of a basic catalyst such as pyridine until the desired end product is formed. Enough pyridine is present to combine with the HCl liberated. The reaction generally takes about 5 to 8 hours. Any alkyl chloroformate having the general formula

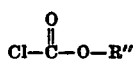

may be used including the methyl, ethyl-, butyl-, isobutyl-, propyl-, isopropyl-, hexyl-, and isohexyl-, chloroformates.

Another method of forming the desired acrylate comprises reacting acrylyl chloride with (hydroxy) alkyl alkyl carbonate having the general formula

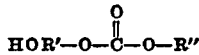

in which R' is an alkylene radical and R'' is an alkyl radical. The reaction is carried out in the manner described above for the chloroformate-acrylate reaction using —10° or up to the boiling point of acrylyl chloride. A specific member of these carbonates may be prepared by reacting ethylene glycol with ethyl chloroformate to form beta (hydroxy) ethyl ethyl carbonate having the general formula

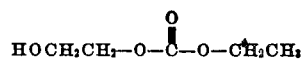

Another method of forming these acrylates comprises reacting an alkali metal acrylate such as sodium acrylate with a chloro-substituted alkyl alkyl carbonate having the general formula

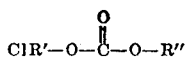

in which R' is an alkylene radical and R'' is an alkyl radical, R' is preferably an alkyl radical having 1 to 2 carbon atoms. A specific member of these carbonates may be formed by reacting a chlorine substituted glycol having the general formula $ClCH_2CH_2OH$ with ethyl chloroformate. The mixture of reactants is heated up to 150° C. and until the reaction is complete.

Another method of preparing these acrylates comprises reacting an aliphatic alcohol with an acrylyl oxysubstituted alkyl chloroformate. A specific member of these formates is one resulting from the reaction of ethyl alcohol and beta-(hydroxy) ethyl chloroformate. The formate is prepared by reacting beta-(hydroxy) ethyl acrylate with phosgene at —10° C. to give

Another method of preparing these acrylates comprises reacting beta-(hydroxy) ethyl-beta-chloropropionate with ethyl chloroformate to give a compound having the general formula

which compound is then treated with a dehydrochlorination catalyst such as pyridine to give the desired beta (acrylyloxy) ethyl ethyl carbonate.

Another method that may be used in preparing these acrylates comprises reacting sodium acrylate with ethylene chlorohydrin to produce beta-(hydroxy) ethyl acrylate which is then reacted with ethyl chloroformate to form the desired compound.

The acrylates of this invention may be polymerized to form a polymeric material. When the polymer, which is generally powdery in form, is heated a clear resinous product is produced.

The following examples represent polymers resulting from the polymerization of the acrylates of this invention. Parts are by weight.

EXAMPLE 1

Ten parts of acryloxy ethyl methyl carbonate of the formula

was heated at 60° C. with .1 part of benzoyl peroxide to form a crumbly solid polymer.

EXAMPLE 2

Ten parts of acryloxy ethyl n-propyl carbonate of the formula

was heated at 60° C. with .1 part of benzoyl peroxide to form a crumbly solid polymer.

The acrylates of this invention may also be copolymerized with another copolymerizable monomer including styrene, methyl methacrylate, vinyl acetate, vinyl chloride and vinylidene chloride. Any monomer copolymerizable with these acrylates may be used. The acrylate may be copolymerized with the other copolymerizable monomer in amounts between 10 to 90 parts per 100 parts by weight of the mixture of the two monomers.

The copolymers are prepared by reacting a mixture of the monomers in the presence of a suitable catalyst in emulsion until the reaction is substantially complete. The temperature may vary from 0° C. to 100° C. Where the reaction is particularly slow, a catalyst may be added including the peroxide catalysts such as potassium persulfate, ammonium persulfate, benzoyl peroxide, cumene hydroperoxide, and others.

The following examples represent copolymers that may be prepared using the acrylate as one of the monomers to be copolymerized.

Table I

| Example | Parts of Vinyl Chloride | Parts of X Monomer | Reaction Time | Yield |
|---|---|---|---|---|

(X MONOMER BEING METHACRYLOXYETHYL ETHYL CARBONATE)

| | | | Hours | Per Cent |
|---|---|---|---|---|
| 3 | 90 | 10 | 18 | 85.0 |
| 4 | 80 | 20 | 18 | 80.0 |
| 5 | 50 | 50 | 135 | 52.5 |
| 6 | 30 | 70 | 159 | 0.0 |

(X MONOMER BEING ACRYLOXYETHYL METHYL CARBONATE)

| | | | | |
|---|---|---|---|---|
| 7 | 90 | 10 | 18 | 87.5 |
| 8 | 80 | 20 | 39 | 90.0 |
| 9 | 70 | 30 | 39 | 90.0 |
| 10 | 50 | 50 | 63 | 87.5 |

(X MONOMER BEING ACRYLOXYETHYL ETHYL CARBONATE)

| | | | | |
|---|---|---|---|---|
| 11 | 90 | 10 | 18 | 87.5 |
| 12 | 70 | 30 | 39 | 71.5 |
| 13 | 50 | 50 | 39 | 50.0 |
| 14 | 30 | 70 | 159 | 21.5 |
| 15 | 10 | 90 | 159 | 1.5 |

(X MONOMER BEING ACRYLOXYETHYL PROPYL CARBONATE)

| | | | | |
|---|---|---|---|---|
| 16 | 90 | 10 | 159 | 87.5 |
| 17 | 70 | 30 | 159 | 0.05 |
| 18 | 50 | 50 | 159 | 0.0 |

(X MONOMER BEING ACRYLOXYETHYL BUTYL CARBONATE)

| | | | | |
|---|---|---|---|---|
| 19 | 90 | 10 | 18 | 97.5 |

Table II

| Example | Parts of Vinylidene Chloride | Parts of X monomer | Reaction Time | Yield |
|---|---|---|---|---|

(X MONOMER BEING METHACRYLOXYETHYL ETHYL CARBONATE)

| | | | | Per cent |
|---|---|---|---|---|
| 20 | 90 | 10 | 39 | 75.0 |
| 21 | 80 | 20 | 63 | 72.5 |
| 22 | 50 | 50 | 159 | 50.0 |
| 23 | 30 | 70 | 159 | 31.0 |

(X MONOMER BEING ACRYLOXYETHYL METHYL CARBONATE)

| | | | | |
|---|---|---|---|---|
| 24 | 90 | 10 | 63 | 87.5 |
| 25 | 80 | 20 | 39 | 77.5 |
| 26 | 70 | 30 | 39 | 85.0 |
| 27 | 50 | 50 | 63 | 85.0 |

(X MONOMER BEING ACRYLOXYETHYL ETHYL CARBONATE)

| | | | | |
|---|---|---|---|---|
| 28 | 90 | 10 | 39 | 82.5 |
| 29 | 70 | 30 | 39 | 70.0 |
| 30 | 50 | 50 | 159 | 51.0 |
| 31 | 30 | 70 | 159 | 37.5 |
| 32 | 10 | 90 | 159 | 0.0 |

(X MONOMER BEING ACRYLOXYETHYL PROPYL CARBONATE)

| | | | | |
|---|---|---|---|---|
| 33 | 90 | 10 | 159 | 17.5 |
| 34 | 70 | 30 | 159 | 1.0 |
| 35 | 50 | 50 | 159 | 0.0 |

(X MONOMER BEING ACRYLOXYETHYL BUTYL CARBONATE)

| | | | | |
|---|---|---|---|---|
| 36 | 90 | 10 | 39 | 85.0 |

Table III

| Example | Parts of Styrene | Parts of Acryloxy ethyl ethyl carbonate | Yield |
|---|---|---|---|
| 37 | 0 | 10.0 | 9.0 |
| 38 | 9.0 | 1.0 | 9.0 |
| 39 | 7.5 | 2.5 | 8.15 |
| 40 | 5.0 | 5.0 | 5.6 |

In Examples 3 through 36, 20 parts of monomers in the proportions indicated were heated in the reactor at 39° C. with 12 cc. of 3% Duponol ME (sodium lauryl sulfate), 12 cc. of pH 8 MacIlvaine's buffer (Handbook of Chemistry & Physics, 23rd edition, p. 1022), and 0.1 g. of NaBO₃.4H₂O. The solubilities are shown as follows:

COPOLYMERS OF ACRYLOXY ETHYL ETHYL CARBONATE AND STYRENE

| Solvent | Carbonate/styrene Polymer Composition | | | | | | | |
|---|---|---|---|---|---|---|---|---|
| | 10/90 | | 25/75 | | 50/50 | | 75/25 | |
| | 1 cc. | 3 cc. | 1 cc. | 3 cc. | 1 cc. | 3 cc. | 1 cc. | 3 cc. |
| Ethyl Alcohol | Ins | Ins | Ins | Ins | Ins | Ins | Ins | Ins. |
| Acetone | Sl. Swelled | Sl. Sol | Sl. Swelled | Sl. Swelled | Sl. Swelled | Sl. Swelled | Swelled | Swelled. |
| Ethylene dichloride | Swelled | Thick gel | Swelled | Swelled | Swelled | Swelled | do | Do. |
| Benzene | do | do | do | do | do | Sl. Sol | do | Sl. Sol. |
| Methyl Ethyl Ketone | do | Sl. Sol | do | Sl. Sol | Sl. Swelled | do | do | Do. |

COPOLYMERS OF ACRYLOXY ETHYL ETHYL CARBONATE AND VINYLIDENE CHLORIDE

| Solvent | Carbonate/vinylidene chloride polymer compositions | | | | | | | |
|---|---|---|---|---|---|---|---|---|
| | 10/90 | | 25/75 | | 50/50 | | 75/25 | |
| | 1 cc. | 3 cc. | 1 cc. | 3 cc. | 1 cc. | 3 cc. | 1 cc. | 3 cc. |
| Ethyl Alcohol | Ins | Ins | Ins | Ins | Ins | Ins | Ins | Ins. |
| Acetone | do | do | do | do | do | do | do | Sl. Swelled. |
| Ethylene dichloride | do | do | do | do | Swelled | Swelled | Swelled | Sl. Sol. |
| Benzene | do | do | do | do | Ins | Ins | do | Swelled. |
| Methyl Ethyl Ketone | do | do | do | do | do | do | do | Do. |

COPOLYMERS OF ACRYLOXY ETHYL ETHYL CARBONATE AND METHYL METHACRYLATE

| Solvent | Carbonate/Methyl Methacrylate Polymer Composition | | | | | | | |
|---|---|---|---|---|---|---|---|---|
| | 10/90 | | 25/75 | | 50/50 | | 75/25 | |
| | 1 cc. | 3 cc. | 1 cc. | 3 cc. | 1 cc. | 3 cc. | 1 cc. | 3 cc. |
| Ethyl Alcohol | Ins | Ins | Ins | Ins | Ins | Si. Swelled | Ins | Ins. |
| Acetone | Sl. Sol | Sl. Sol | Sl. Sol | Sl. Sol | Sl. Swelled | Sl. Sol | Sl. Swelled | Sl. Sol. |
| Ethylene Dichloride | Swelled | Sol | do | do | Swelled | do | Swelled | Swelled. |
| Benzene | Sl. Sol | Sl. Sol | do | Sol | Sl. Sol | Sol | Sl. Sol | Sol. |

The monomers are useful in the preparation of polymeric materials and copolymers. The polymeric materials including the copolymers and especially the vinyl chloride copolymer are useful in the preparation of molded articles, coatings, adhesives, electrical insulations, films, sheets, tubed articles and mechanical goods.

While certain representative embodiments and details have been shown for the purpose of illustrating the invention, it will be apparent to those skilled in this art that various changes and modifications may be made therein without departing from the spirit or scope of the invention.

We claim:

1. An ester having the structural formula

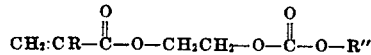

in which R is a radical selected from the group consisting of chlorine, hydrogen and methyl and R'' is an alkyl radical containing from 1 to 6 carbon atoms.

2. An ester having the structural formula

3. A polymer of the compound of claim 1.
4. A polymer of the compound of claim 2.
5. The copolymer of 90 to 10 parts of the compound of claim 1 and 10 to 90 parts of another copolymerizable monomer selected from the group consisting of styrene, vinyl chloride and vinyl acetate.
6. The copolymer of 90 to 10 parts of the compound of claim 2 and 10 to 90 parts of styrene.
7. The copolymer of 90 to 10 parts of the compound of claim 2 and 10 to 90 parts of vinyl chloride.
8. The copolymer of 90 to 10 parts of the compound of claim 2 and 10 to 90 parts of vinyl acetate.

FRED W. COX.
JAMES M. WALLACE, Jr.

REFERENCES CITED

The following references are of record in the file of this patent:

UNITED STATES PATENTS

| Number | Name | Date |
|---|---|---|
| 2,141,546 | Strain | Dec. 27, 1938 |
| 2,384,124 | Muskat et al. | Sept. 4, 1945 |